73628 R. S. Mitchell's Flour Scoop.

PATENTED
JAN 21 1868

United States Patent Office

RUFUS S. MITCHELL, OF ELIZABETH, INDIANA.

Letters Patent No. 73,628, dated January 21, 1868.

IMPROVED FLOUR-SCOOP AND SIFTER.

The Schedule referred to in these Letters Patent and making part of the same.

TO ALL WHOM IT MAY CONCERN:

Be it known that I, RUFUS S. MITCHELL, of Elizabeth, in the county of Harrison, and State of Indiana, have invented a new and improved Flour-Scoop; and I do hereby declare that the following is a full, clear, and exact description thereof, which will enable others skilled in the art to make and use the same, reference being had to the accompanying drawings, forming a part of this specification.

This invention relates to an improved flour-scoop, and consists in combining a sifter and scoop in one device.

In the accompanying drawings—

Figure 1:
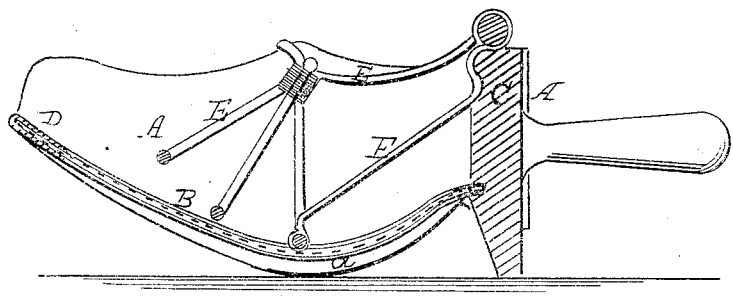
Figure 2:
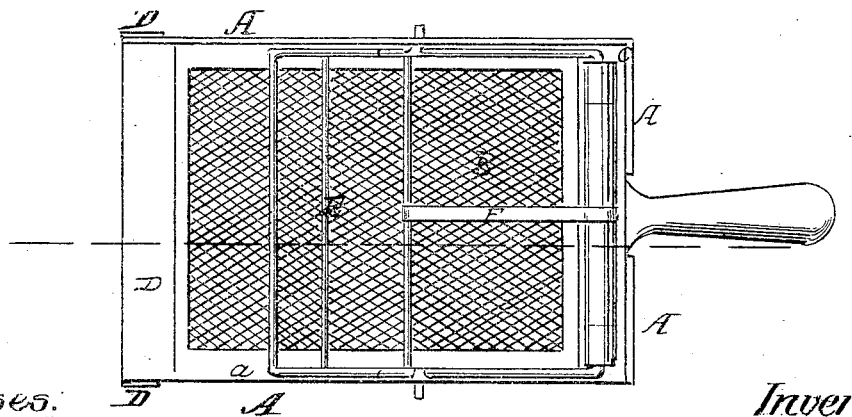

Figure 1 is a vertical section, at line $x\ x$, of Figure 2, which is a top view of my improved scoop.

Similar letters of reference indicate corresponding parts.

In the present instance, the scoop consists of the sides A A, stamped so as to form a shoulder, $a\ a$, shown in the dotted lines in fig. 2; but the two sides A A and lip D might, if preferred, be constructed of one piece of metal, on which rests the frame of the sieve B. The rear ends of the sides A lap over and are secured to the wooden back C. The lip D laps over and is soldered or riveted to the front ends of the sides A, and also laps over the front end of the sieve B, which is further protected from injury by a flange projecting from the shoulder formed in side pieces A.

E is a wire beater, which may be dispensed with, if desired. It is kept down, when not in use, by the spring F, or any equivalent. It may be furnished with wooden or rubber rollers, to prevent injury to the sieve in case, at any time, it should be bent out of shape.

Having thus described my invention, what I claim as new, and desire to secure by Letters Patent, is—

A flour-scoop, consisting of the sides A, having shoulders $a$, lip D, sieve B, wooden back C, beater E, and spring F, all constructed, arranged, and operating as and for the purpose set forth.

RUFUS S. MITCHELL.

Witnesses:
GEO. W. THOMPSON,
HIRAM KESSINGER.